United States Patent [19]
Scheiber

[11] Patent Number: 5,268,878
[45] Date of Patent: Dec. 7, 1993

[54] ACCELEROMETER SENSOR NOISE REDUCTION METHOD ANDD MEANS

[76] Inventor: Donald J. Scheiber, 1299 N. 650 W., Columbia City, Ind. 46725

[21] Appl. No.: 918,743

[22] Filed: Jul. 27, 1992

[51] Int. Cl.⁵ ............................................. H04R 17/00
[52] U.S. Cl. ................................. 367/140; 367/157; 367/165; 367/180; 367/173; 367/901; 181/110
[58] Field of Search ............... 367/155, 157, 165, 180, 367/901, 140, 141, 173; 181/110, 112

[56] References Cited

U.S. PATENT DOCUMENTS

| | | | |
|---|---|---|---|
| 3,603,921 | 9/1971 | Dreisbach | 367/155 X |
| 4,162,476 | 7/1979 | Fanning | 367/157 |
| 4,368,525 | 1/1983 | Obata et al. | 367/165 |
| 4,789,971 | 12/1988 | Powers et al. | 367/157 |
| 4,928,263 | 5/1990 | Armstrong et al. | 367/157 |

Primary Examiner—J. Woodrow Eldred
Attorney, Agent, or Firm—John H. Crozier; Richard T. Seeger

[57] ABSTRACT

In a preferred embodiment, an accelerometer sensor system, having a first axis of rotation at a first given frequency of periodic oscillation thereabout, which accelerometer sensor includes: a first acceleration sensor; a platform to which the first acceleration sensor is fixedly attached; and the first acceleration sensor being vertically displaced from the first axis of rotation by a first selected distance such that the noise received by the first acceleration sensor, due to the periodic oscillation at the first frequency, is reduced.

8 Claims, 4 Drawing Sheets

ACCELEROMETER SENSOR NOISE REDUCTION METHOD ANDD MEANS

BACKGROUND OF THE INVENTION

1. Field of the Invention

The present invention relates to accelerometers generally and, more particularly, but not by way of limitation, to a novel method and means for cancellation of accelerometer sensor noise due to dynamic pitch motion of the platform on which the sensor is mounted.

2. Background Art.

A need has long existed for a method and means to reduce or eliminate flow noise and mechanically induced noise in directional hydrophones. This noise is predominant near the low end of the frequency range of interest (near 10 Hz), and generally increases in severity as the flow increases. The noise is due, in part, to mechanical vibrations induced by flow past various components of the system and, in part, to motion induced into the system due to surface waves. The directional sensor may be regarded as a very sensitive accelerometer which responds to these mechanical vibrations and perturbations. These vibrations are coupled to the sensor through the support cables and suspension components of the buoy system. The present invention relates to means by which the sensor's sensitivity to these motion induced vibrations can be reduced; however, it will be apparent to those skilled in the art that the invention may be readily applied to other types of accelerometer based sensors.

Many direction hydrophones, microphones or accelerometer sensors, operate basically as accelerometers whose main axis of sensitivity is in the horizontal plane. Such devices not only respond to the horizontal acceleration of the mounting platform due to the acoustic driving force (or acceleration of the platform on which the sensor is mounted), but also to other forces which accelerate the body in translational or rotational motion. Such an accelerometer based sensor will also respond to the component of gravity which acts along the sensitive axis of the device.

If the sensor platform is periodically tilted about a horizontal axis normal to the sensitive axis of the horizontal accelerometer, then the gravitational force component in the direction of the sensitive axis of the sensor will cause a periodic output from the sensor indistinguishable from the output caused by a periodic acceleration or from the output due to an acoustic excitation. This gravity induced output is one form of undesirable motion induced noise caused in this case by pitch motion about a horizontal axis.

There is also a component of acceleration in the output of the sensor caused by rotational accelerational effects as the sensor platform periodically tilts about a horizontal axis, the same motion described above. The amplitude of this acceleration component is given by the angular acceleration of the platform times the distance from the axis of rotation to the reaction mass of the sensor.

Accordingly, it is a principal object of the present invention to provide a method and means to reduce noise experienced by accelerometer sensors.

It is another object of the invention to provide such means that is easily and economically constructed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an accelerometer sensor system, having a first axis of rotation at a first given frequency of periodic oscillation thereabout, comprising: a first acceleration sensor; a platform to which said first acceleration sensor is fixedly attached; and said first acceleration sensor being vertically displaced from said first axis of rotation by a first selected distance such that the noise received by said first acceleration sensor, due to said periodic oscillation at said first frequency, is reduced.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
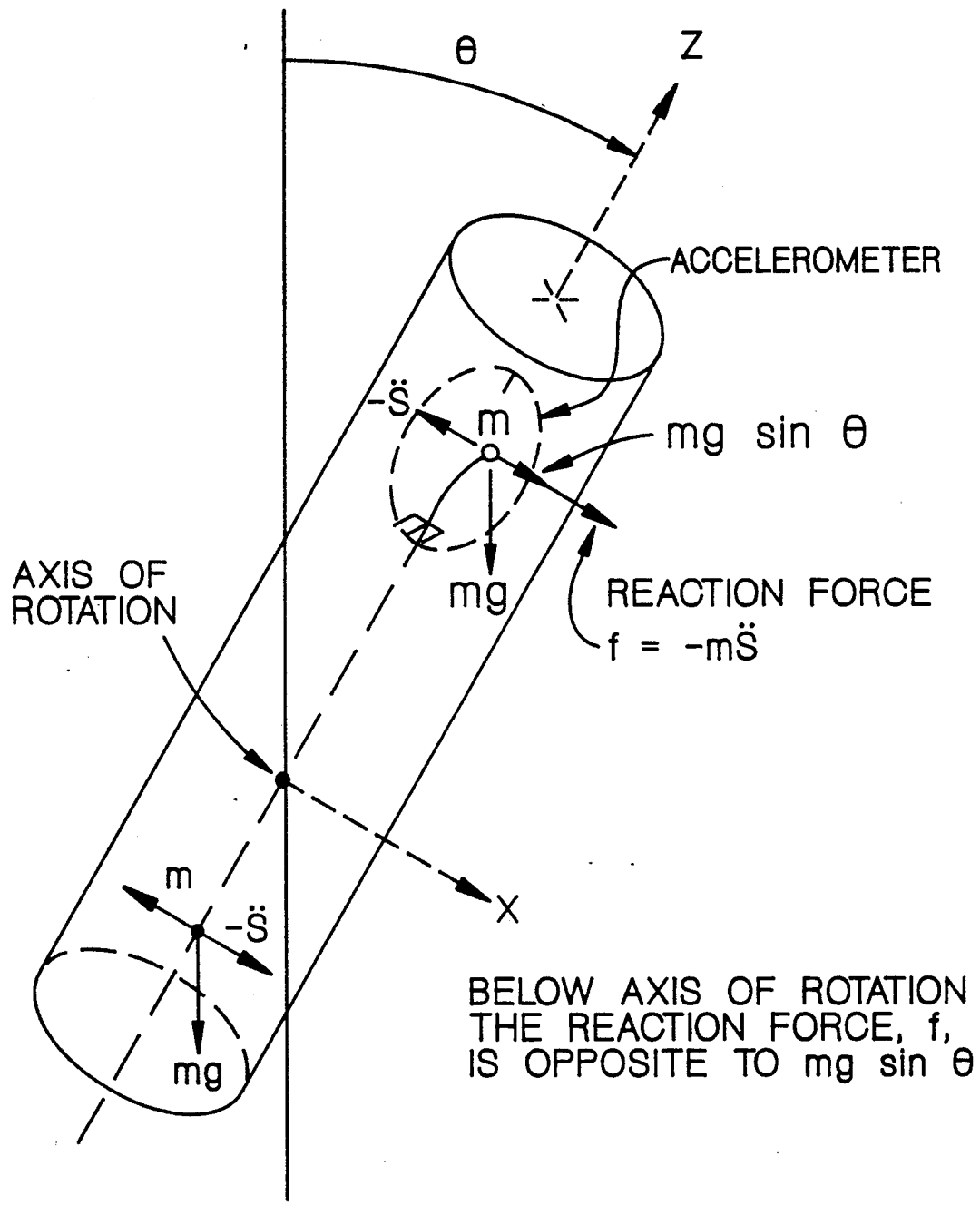
FIG. 1 schematically illustrates the forces on a sensor rotatingly displaced from a vertical position.

Reference should now be made to the drawing figures, provided for purposes of illustration only and not intended to be a limitation on the invention described herein, on which similar or identical elements are given consistent identifying numerals throughout the various figures thereof, and on which parenthetical references direct the reader to the figure(s) on which the element(s) being described is (are) best seen, although the element(s) may be seen on other figures also.

The following equations, with reference to the nomenclature of FIG. 1, provide the theoretical basis for the present invention:

The acceleration of mass, "m", due to rotation is given by:

(1) $S = -z\omega^2 \theta_0 \sin\omega t$, where S is the arcuate displacement of m from the vertical, z is the distance along the Z axis of m from the axis of rotation, $\theta$ is the angle between the vertical and the displaced Z axis, and $\omega$ is the angular velocity of m.

The reaction force on m at z is:

(2) $f = m\ddot{S}$.

The total force per unit mass, in the s direction, including gravitational forces, is:

(3)

$$f_t = \frac{f + mg\sin\theta}{m},$$

where g is the gravitational acceleration.

Substituting:

(4) $f_t = \ddot{S} + g\sin\theta$.

From above:

(5) $f_t = +z\omega^2\theta + g\sin\theta$.

For small $\theta$, (6) $\sin\theta = \theta$.

Therefore:

(7) $f_t = (g + z\omega^2)\theta_o \sin\omega t$.

An accelerometer based sensor will produce an output proportional to $f_t$. For the apparent acceleration, and the resulting sensor output, to be zero requires that:

(8) $-z\omega^2 = g$.

Therefore, for each frequency there is a position on the oscillating body at which acceleration and gravitation effects cancel and for which the apparent acceleration is zero. Consequently, for a limited range of frequencies, the vertical location of a sensor relative to the axis of rotation can be selected so as to null the noise created by tilting of the platform on which the sensor is mounted.

If a rigid pivot is provided for the sensor, then the axis of rotation is clearly defined. In the general case, however, in which the sensor is supported by (from) a flexible cable, the axis of rotation may be determined by mathematical modeling or by dynamic analysis. In either case, the axis of rotation is a function of frequency.

At frequencies above the pendulation and "rocking mode" frequencies of the sensor, the axis of rotation approaches a high frequency limit. Analysis shows that this limit is given by the expression:

$$z_r = z_{cg} - \frac{I}{mL}, \quad (9)$$

where $z_r$ is the vertical location of the axis of rotation, $z_{cg}$ is the location of the sensor's center of gravity, I is the moment of inertia about the center of gravity, and L is the distance to the support cable tie point from the center of gravity. The general expression (9) is completely valid in a fluid which fluid will, however, increase the mass, M, and the rotary inertial term I, due to added mass effects.

Equation (9) also indicates that the axis of rotation can be changed by adjusting the support point, which will change the value of L. If an arm were attached to the body, making L very large, then the axis of rotation would remain at the center of gravity. As L gets smaller, the axis of rotation drops below the center of gravity. In the general case, the axis of rotation remains below the center of gravity while the point at which the mass centroid of the sensor should be placed to achieve a "noise" null is below this by a distance $g/w^2$. Therefore, at frequencies above the pitch resonance of the body, the sensor should be placed near a point given by the equation:

$$z_{sensor} = z_{cg} - \frac{I}{mL} - \frac{g}{\omega^2}, \quad (10)$$

in order to achieve a null in the output due to pitch rotational effects. Note that the null can be achieved over a range of sensor locations by suitably modifying or "tuning" the length L to the sensor support cable, or by changing the ratio of the moment of inertia to the mass (I/m).

Figure 2:
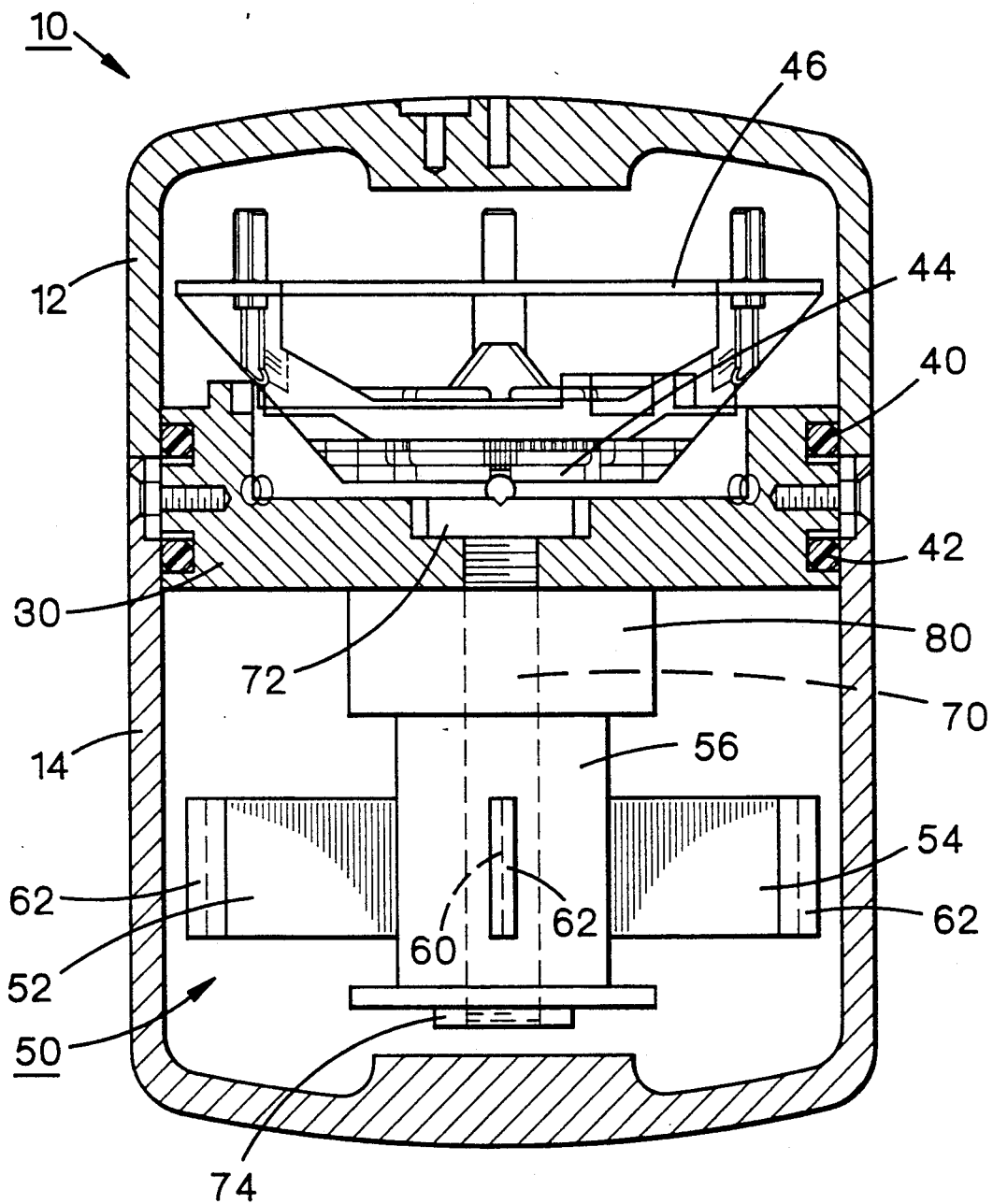
FIG. 2 illustrates a one embodiment of a sensor system constructed according to the present invention.

FIG. 2 illustrates an accelerometer sensor system, in this case a directional hydrophone system, generally indicated by the reference numeral 10, constructed according to the present invention. Sensor system 10 includes upper and lower housing members 12 and 14, respectively, joined at a bulkhead 30. Upper and lower housing members sealingly engage intermediate bulkhead 30 by means of O-rings 40 and 42, respectively. Disposed in upper housing member 12 are an electronic compass 44 and an electronics board 46, both of conventional type for the application.

Disposed in lower housing member 14 is a sensor, generally indicated by the reference numeral 50 comprising a first pair of oppositely disposed piezoelectric elements 52 and 54 mounted on a vertical mounting block 56 and a second pair of oppositely disposed piezoelectric elements 58 and 60 (FIG. 3) mounted orthogonal to the first pair. Piezoelectric elements 52, 54, 58, and 60 have mass members 62 mounted at the periphery thereof. Mounting block 56 is attached to bulkhead 30 by a vertical threaded rod 70 having nuts 72 and 74 threaded, respectively, on the upper and lower ends thereof, such that piezoelectric elements 52, 54, 58, and 60 are rigidly attached to bulkhead 30, but are spaced from the bulkhead by means of a spacer 80.

The thickness of spacer 80 will be set by determining the position of the axis of rotation for a given sensor system at a given frequency and then determining the required vertical position of piezoelectric elements 52, 54, 58, and 60 to null the apparent acceleration: the lower the frequency, the farther will the piezoelectric elements be spaced below bulkhead 30. For a hydrophone application, the frequency of interest will typically be in the 5-10 Hz range.

Figure 3:
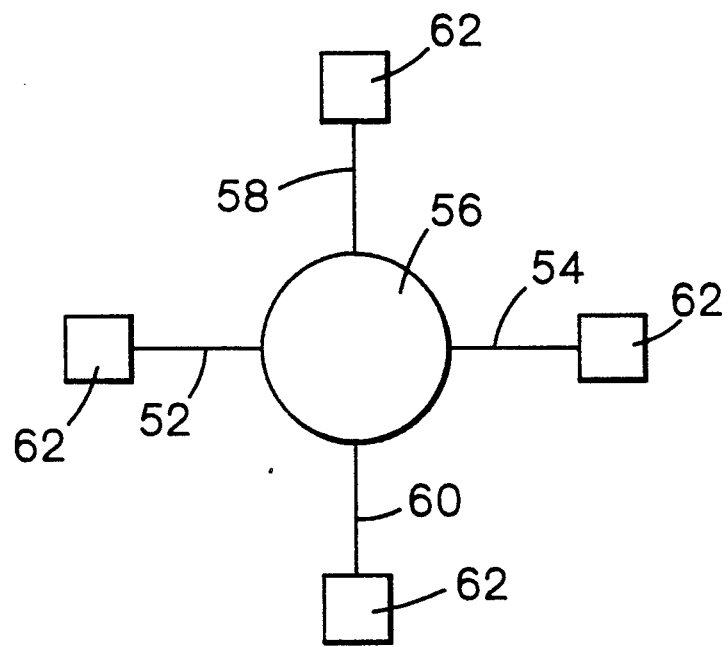
FIG. 3 is a fragmentary, schematic, top plan view of the embodiment of FIG. 2.

FIG. 3 illustrates the relative positions of first and second piezoelectric sensor pairs 52/54 and 58/60, respectively, such that the outputs of directivity are orthogonal, whereby:

$52 + 54 = X_{out}$, and $58 + 60 = Y_{out}$.

Figure 4:
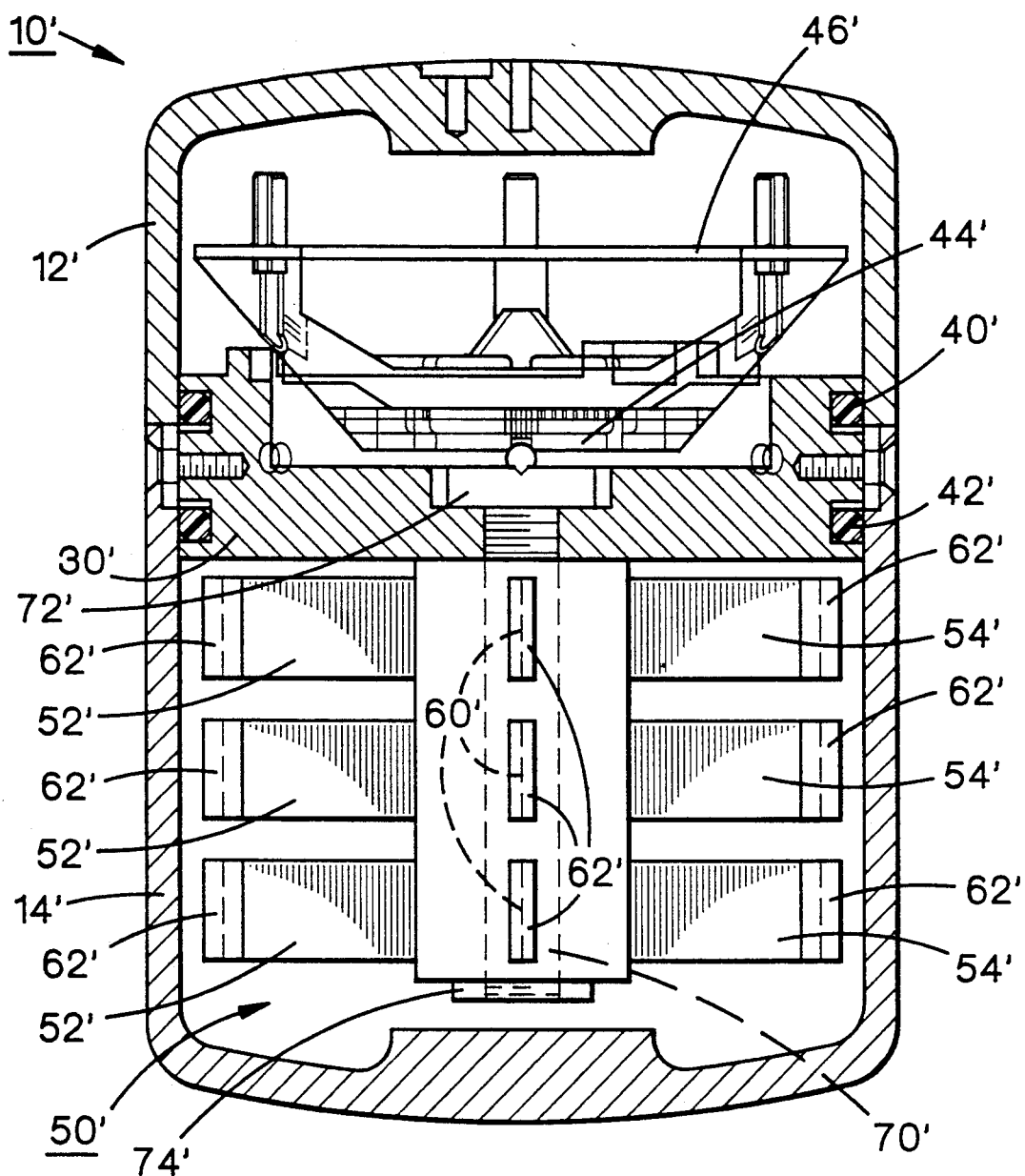
FIG. 4 illustrates another embodiment of a sensor system constructed according to the present invention.

FIG. 4 illustrates an accelerometer sensor system, generally indicated by the reference numeral 10', in which elements similar to the elements of sensor system 10 on FIG. 2 are given primed reference numerals. Sensor system 10' is generally identical to sensor system 10, except that sensor 50' includes three first and second pairs of vertically spaced apart piezoelectric elements 52'/54' and 58'/60'. So constructed, sensor system 10' provides noise reduction over three different portions of the frequency spectrum. One could, for example, sequentially look from one of first and second piezoelectric element pairs 52'/54' and 58'/60' to the next with a signal processor, in order to enhance detection of a weak signal at an unknown frequency within the band of useful noise suppression of the sensors.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An accelerometer sensor system, having a first horizontal axis of rotation at a first given frequency of periodic oscillation thereabout, comprising:

(a) a first acceleration sensor;

(b) a platform to which said first acceleration sensor is fixedly attached; and (c) said first acceleration sensor being vertically displaced from said first horizontal axis of rotation by a first selected distance such that any noise induced into said first acceleration sensor, due to said periodic oscillation at said first frequency, is reduced.

2. An accelerometer sensor system, as defined in claim 1, wherein said first selected distance, "$z_1$", is determined by the relationship:

$$z_1 = -\frac{g}{\omega_1^2},$$

where "g" is the gravitational acceleration and $\omega_1$ is the angular velocity of said sensor system oscillating about said first axis of rotation.

3. An accelerometer sensor system, as defined in claim 1, wherein said sensor system has a second horizontal axis of rotation at a second given frequency of periodic oscillation thereabout, and wherein said sensor system further comprises a second acceleration sensor fixedly attached to said platform and being vertically displaced from said second horizontal axis of rotation by a second selected distance such that any noise received by said second acceleration sensor, due to periodic oscillation at said second frequency, is reduced.

4. An accelerometer sensor system, as defined in claim 3, wherein said second selected distance, "$z_2$", is determined by the relationship:

$$z_2 = -\frac{g}{\omega_2^2},$$

where "g" is the gravitational acceleration and $\omega_2$ is the angular velocity of said sensor system oscillating about said second axis of rotation.

5. An accelerometer sensor system, having a first horizontal axis of rotation at a first given frequency of periodic oscillation thereabout, and having a first acceleration sensor, a method of reducing noise received by said first acceleration sensor, due to periodic oscillation at said first frequency, comprising: vertically displacing said first acceleration sensor from said first horizontal axis of rotation by a first selected distance.

6. A method, as defined in claim 5, wherein said first selected distance, "$z_1$", is determined by the relationship:

$$z_1 = -\frac{g}{\omega_1^2},$$

where "g" is the gravitational acceleration and $\omega_1$ is the angular velocity of said sensor system oscillating about said first axis of rotation.

7. A method, as defined in claim 5, wherein said sensor system has a second horizontal axis of rotation at a second given frequency of periodic oscillation thereabout and has a second acceleration sensor, and said method further comprises: vertically displacing said second acceleration sensor from said second horizontal axis of rotation by a second selected distance such that any noise received by said second sensor, due to periodic oscillation at said second frequency, is reduced.

8. A method, as defined in claim 7, wherein said second selected distance "$z_2$", is determined by the relationship:

$$z_2 = -\frac{g}{\omega_2^2},$$

where "g" is the gravitational acceleration and $\omega_2$ is the angular velocity of said sensor system rotating about said second axis of rotation.

* * * * *